United States Patent Office 3,448,124
Patented June 3, 1969

3,448,124
PRODUCTION OF PROPYLENE OXIDE
Edward J. Buyalos, Hopewell, Va., assignor to Allied Chemical Corporation, New York, N.Y., a corporation of New York
No Drawing. Filed Apr. 6, 1965, Ser. No. 446,113
Int. Cl. C07d 1/02, 1/12
U.S. Cl. 260—348.5                  4 Claims

ABSTRACT OF THE DISCLOSURE

A method of non-catalytically oxidizing propylene which includes passing propylene and an oxygen-containing gas through a reaction zone containing dimethyl phthalate liquid heated to within the range of 160°–250° C., maintaining a pressure of 150–250 p.s.i.g. above said liquid, withdrawing dimethyl phthalate from the reaction zone, and adding fresh dimethyl phthalate to the reaction zone.

---

This invention relates to the liquid phase oxidation of propylene to propylene oxide. More particularly, it relates to a novel noncatalytic oxidation of propylene in the liquid phase with an oxygen containing gas in an organic liquid medium.

It has heretofore been proposed to effect the air oxidation of propylene in the liquid phase in order to produce propylene oxide. In order to maintain liquid conditions at the temperatures necessary for the oxidation, the use of high pressures has also been found requisite owing to the high vapor pressure of propylene. It has also been proposed to employ inert organic liquid solvent mediums to reduce the pressures required to maintain a liquid phase containing propylene to be oxidized and to distribute the heat of reaction evenly thereby avoiding localized overheating resulting from the exothermic character of the oxidation. The oxidation is difficult to control and a considerable proportion of the starting material is oxidized to acids through rupture at the double bond while some of the propylene oxide produced polymerizes or is hydrolyzed to propylene glycol by the water of reaction.

All of the above mentioned processes, however, employ catalysts such as salts of cobalt, vanadium, manganese and copper, or said catalysts in admixture with compounds of barium and lead, the latter being used as "promoters" for the primary catalytic component.

It is accordingly an object of this invention to provide a novel process for the noncatalytic liquid phase oxidation of propylene to propylene oxide.

It is another object of this invention to provide a novel process which will result in higher yields of propylene oxide.

These and other objects will be apparent from and flow from the following description of the invention.

In accordance with the present invention, it has now been found that propylene oxide may be produced by a process which comprises oxidizing propylene in the liquid phase, by passing propylene and an oxygen-containing gas, under pressure, through a dimethyl phthalate solvent medium, in the absence of a catalyst. While conventional oxidation catalysts may be employed in carrying out the invention and may contribute the advantage of accelerating the reaction, they are not necessary to operation of the process.

The oxidation of propylene is achieved by introducing propylene and an oxygen-containing gas such as air to the bottom of a vertical reactor containing dimethyl phthalate. The reactor is maintained at a temperature of about 160 to 250° C., preferably 205 to 210° C. and at a pressure above atmospheric preferably 150 to 250 p.s.i.g. It has been discovered that using dimethyl phthalate solvent medium results in significantly higher yields of propylene oxide, and further, it has been discovered that the oxidation reaction is best sustained by gradual injection of fresh dimethyl phthalate to the reactor. Preferably, dimethyl phthalate is injected at the rate of about one-sixtieth (1/60) of the solvent volume per minute. The reaction gases pass upwardly through the solvent and exit from the top of the reactor, after which propylene oxide is recovered from the exit gas and solvent by conventional means.

In a preferred process of this invention, acetaldehyde may be added to the reaction mixture as an initiator. Of particular advantage in the use of acetaldehyde as an initiator is that the oxidation reaction may be conducted at lower temperatures. The employment of lower temperatures reduces solvent degradation as well as side reactions, including the decomposition of propylene oxide.

The invention will be described further in conjunction with the following specific examples, but it is to be understood that these are merely illustrative and are not intended to limit the scope of the invention thereto.

Example 1

Into a 450 ml. vertical reactor was loaded 350 ml. of dimethyl phthalate. The temperature in the reactor was increased to 170–180° C. and the pressure was increased to 195 p.s.i.g. by introducing gas consisting of 12.7% $O_2$, 32.5% $C_3H_6$, and 54.8% $N_2$. The temperature was then increased to and held at 202–207° C. throughout the run while a flow of 210 ml./min. (STP) of the gas mixture was maintained. After a short induction period, the reaction started. The concentration of propylene oxide in the exit gas after about 30-minutes operation represented a propylene oxide yield of 50 mols of propylene oxide per 100 mols of propylene consumed. Operation over a period of two hours resulted in continued synthesis of propylene oxide in good yield. After two-hours operation, the reaction rate slowly decreased and a fresh reactor charge of dimethyl phthalate was required.

Example 2

Operation of the reactor system and gas feed was begun as in Example 1. When the concentration of propylene oxide in the gas exit the reactor reached 1%, dimethyl phthalate was pumped to the bottom of the reactor at 5.3 ml./minute and withdrawn at the top at the same rate. The dimethyl phthalate was preheated to 205° C. before entering the reactor. Operation beyond the two-hour period of Example 1 resulted in no decrease in reaction rate due to the cycling of fresh dimethyl phthalate to the reactor.

Example 3

A one inch ID x 40 inch long vertical reactor with a working volume of 350 ml. was charged with 250 ml. of dimethyl phthalate and heated electrically to 230° C. A gas mixture of composition 32% $C_3H_6$, 12% $O_2$, and 56% $N_2$ was introduced into the bottom of the reactor at the rate of 1200 ml./min. (STP) and the pressure of the reactor was 250 p.s.i.g. Then 7 ml. of 9 wt. percent acetaldehyde in dimethyl phthalate was pumped into the bottom of the reactor and reaction began, yielding 1.1% propylene oxide in the exit gas. Pumping of preheated (205° C.) pure dimethyl phthalate into the bottom of the reactor was continued at the rate of 1.9 ml./min. for 2.0 hours, a like amount being withdrawn from the top of the reactor. During this time the propylene oxide in the exit gas decreased to 0.48%. An additional 25 ml. of 1 wt. percent acetaldehyde in dimethyl phthalate was added at the rate of 1.9 ml./minute and the propylene oxide concentration in the exit gas increase to 1.5%.

Example 4

Into a 450 ml. vertical reactor was loaded 350 ml. of dimethyl phthalate and 0.2 gm. of acetaldehyde. The temperature was slowly increased and the reactor was pressured to 190 p.s.i.g. with a gas containing 16.2% $O_2$ and 83.8% propylene. The inlet gas was maintained at 400 ml./min. (STP) throughout the run. When the temperature reached 165–170° C., the reaction started, giving 1.25% propylene oxide in the exit gas. No further increase in temperature was required to sustain the reaction.

During the operation of the process of the invention as described in the above examples any unreacted propylene is recycled to the reactor thus resulting in a highly efficient process.

I claim:
1. A proces for producing propylene oxide which comprises:
   (a) reacting propylene with a molecular oxygen-containing gas in a reaction medium comprising dimethylphthalate;
   (b) maintaining the reaction medium at a temperature of between about 160° C. and 250° C.;
   (c) maintaining the reaction medium under a pressure of between about 150 p.s.i.g. and about 250 p.s.i.g.; and
   (d) withdrawing dimethylphthalate from the reaction medium and adding fresh dimethylphthalate thereto, said withdrawing and said adding of dimethylphthalate being each conducted at the rate of about one-sixtieth of the volume of the reaction medium per minute.
2. A process according to claim 1 wherein:
   about 32.5 parts by weight of propylene are reacted with a gas comprising about 12.7 parts by weight of oxygen and about 54.8 parts by weight of nitrogen;
   the reaction medium is maintained at a temperature of between about 202° C. and about 207° C.; and
   the reaction medium is maintained under a pressure of about 195 p.s.i.g.
3. A process according to claim 1 comprising the further step (e) of conducting said reaction of propylene with a molecular oxygen-containing gas in the presence of acetaldehyde.
4. A process according to claim 3 wherein:
   about 32 parts by weight of propylene are reacted with a gas comprising about 12 parts by weight of oxygen and about 56 parts by weight of nitrogen;
   the reaction medium is maintained at a temperature of about 230° C.;
   the reaction medium is maintained under a pressure of about 250 p.s.i.g.; and
   the concentration of the acetaldehyde in the reaction medium is initially about 0.25% by weight.

References Cited

UNITED STATES PATENTS 2,985,668   5/1961   Shingu _____ 260—348.5

NORMA S. MILESTONE, *Primary Examiner.*